US008923571B2

(12) United States Patent
Dixon et al.

(10) Patent No.: US 8,923,571 B2
(45) Date of Patent: Dec. 30, 2014

(54) AUTOMATED CAMERA FLAT FIELDING AND ALIGNMENT

(75) Inventors: Brad N. Dixon, Corvallis, OR (US);
Timothy S. Hubley, Corvallis, OR (US);
Ronald R. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 13/550,185

(22) Filed: Jul. 16, 2012

(65) Prior Publication Data

US 2014/0015943 A1 Jan. 16, 2014

(51) Int. Cl.
*H04N 1/00* (2006.01)
*G06T 7/00* (2006.01)
(52) U.S. Cl.
USPC .............................. 382/112; 358/1.9; 358/474
(58) Field of Classification Search
USPC .......... 348/61, 92, 93, 126, 128; 358/1.2, 1.9, 358/296, 3.27, 3.24, 3.26, 474, 448, 1.12; 382/111–113, 141, 144, 145, 147, 148, 382/137; 356/402, 429–431; 355/26, 32; 347/129, 138
See application file for complete search history.

(56) References Cited

U.S. PATENT DOCUMENTS

| 5,270,736 | A | * | 12/1993 | Inoue et al. | 347/246 |
| 7,957,000 | B2 | | 6/2011 | Hofeldt et al. | |
| 2002/0090127 | A1 | * | 7/2002 | Wetzel et al. | 382/133 |
| 2004/0046874 | A1 | * | 3/2004 | Tse | 348/224.1 |
| 2005/0002049 | A1 | * | 1/2005 | Chiu | 358/1.12 |
| 2005/0134884 | A1 | * | 6/2005 | Rombola et al. | 358/1.11 |
| 2006/0119734 | A1 | * | 6/2006 | Neel | 348/375 |
| 2011/0170762 | A1 | | 7/2011 | Floeder et al. | |
| 2012/0019875 | A1 | | 1/2012 | Hoover et al. | |
| 2012/0075506 | A1 | | 3/2012 | van Beek | |
| 2014/0002536 | A1 | * | 1/2014 | Chen et al. | 347/19 |

OTHER PUBLICATIONS

ELiiXA, ELiiXA UC8/UC4 Camera User Manual: Color Line Scan Camera, e2V semiconductors SAS, 2011 < http://www.e2v.com/e2v/assets/File/documents/imaging-line-scan-industrial-cameras/UM_ELIIXA_UC4-UC8.pdf.

* cited by examiner

*Primary Examiner* — Victor Kostak

(57) ABSTRACT

In an example, a method for automated camera flat fielding and alignment may include determining a magnification of a camera relative to a first camera axis that is generally parallel to a first print media axis by evaluating first and second magnifications between transitions from a first color to a second color on a setup plot. The method may further include determining, by a processor, a rotation of the camera relative to the first camera axis such that the first magnification is approximately equal to the second magnification.

15 Claims, 13 Drawing Sheets

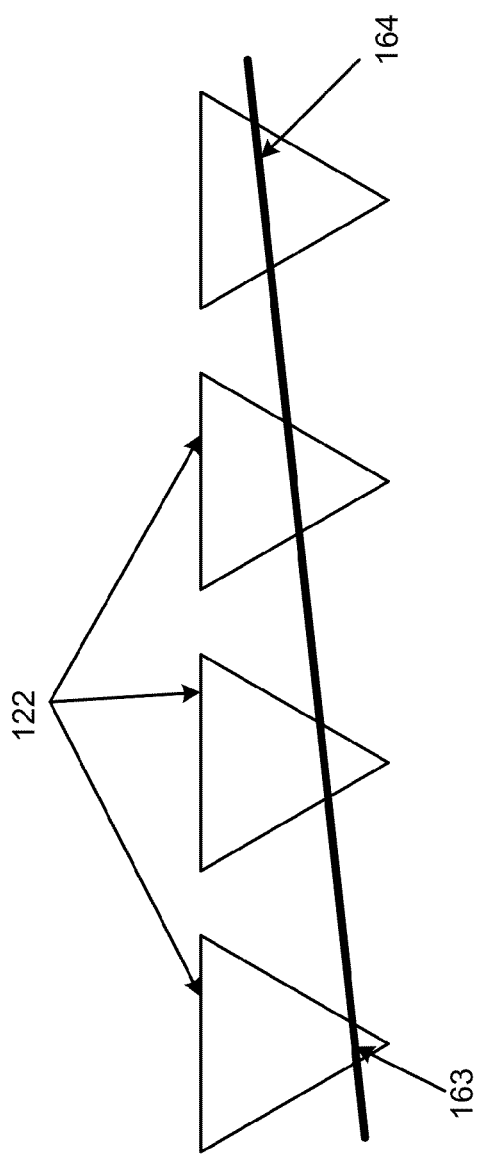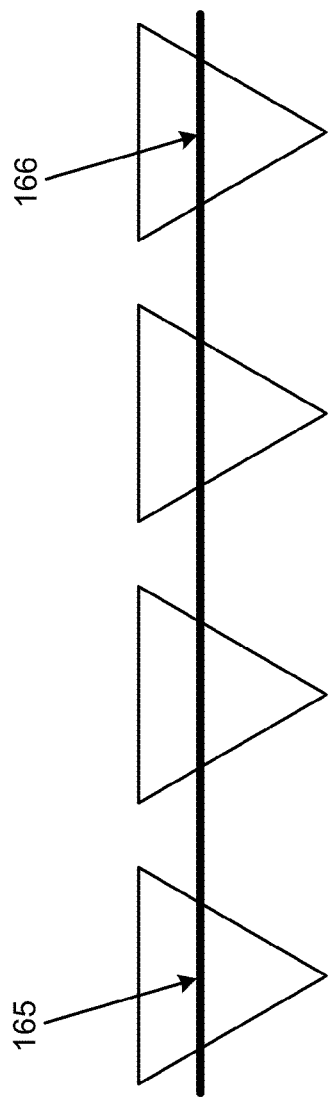

AUTOMATED CAMERA FLAT FIELDING AND ALIGNMENT

BACKGROUND

Machine vision can be used with a digital print press, for example, to provide feedback related to print quality, verify user content, and to document samples from a print job. A camera, such as a line scan camera, can be used to provide such machine vision. Typically, one or more line scan cameras are mounted at various locations on a digital print press. The camera setup process can include initial mounting of the cameras on the digital print press, and visual focusing and alignment of the mounted cameras. Tools, such as levels, may be used to facilitate the camera setup process. While such mounting, focusing and alignment techniques can be adequate for a single camera, a digital print press typically includes multiple cameras configured for visualizing both sides of print media. For multiple cameras, such techniques can add significant lead time to the camera setup process. Moreover, based on the skill level of a technician performing the camera setup, such mounting, focusing and alignment techniques can also add variation and inconsistencies to the camera setup process. The variations and inconsistencies can affect measurements made of printed material and flat fielding of the cameras, which can further affect the overall operational quality of the digital print press.

BRIEF DESCRIPTION OF DRAWINGS

Features of the present disclosure are illustrated by way of example and not limited in the following figure(s), in which like numerals indicate like elements, in which:

FIG. 8 illustrates a camera line scan imager rotated across theta-z alignment triangles, according to an example of the present disclosure;

FIG. 9 illustrates a camera line scan imager aligned in theta-z to alignment triangles, according to an example of the present disclosure;

DETAILED DESCRIPTION

Figure 1:
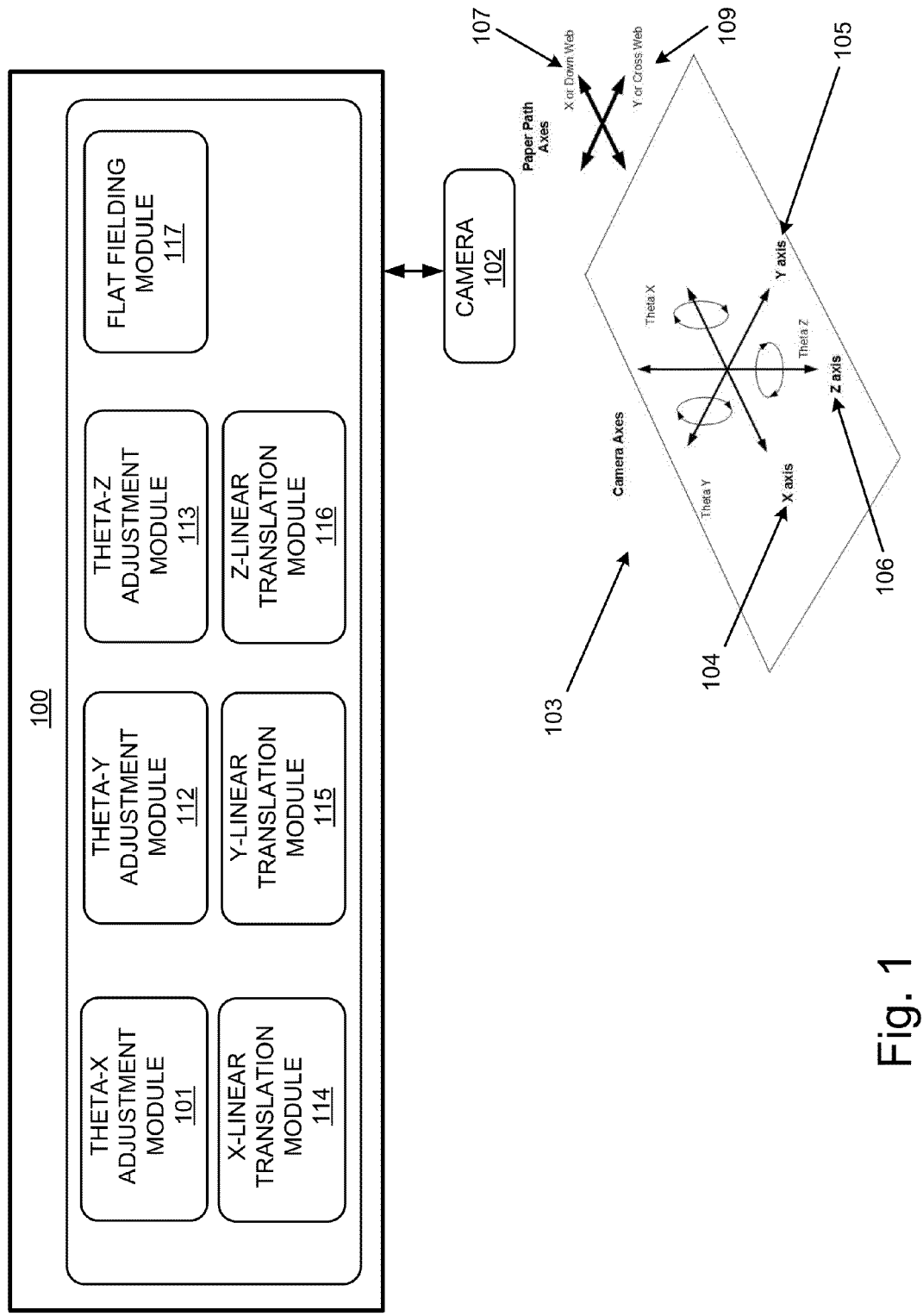
FIG. 1 illustrates an architecture of an automated camera flat fielding and alignment apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Line scan cameras can have a large imager (e.g., 8196 pixels wide) with controlling electronics being subdivided into subsections called taps. A line scan camera may include, for example, sixteen taps across the imager. Each of the taps has its own gain and offset, which are generally different from neighboring tap gain and offset values. Further, each individual pixel has its own gain and offset according to the needs of individual pixel sensitivities. The result of these compounding gains and offsets can be an erratic image brightness across the image (e.g., non-flat white images). Additionally, since line scan cameras image one horizontal line in an image at a time, if the camera is not setup precisely relative to a moving print media web relative to the camera x, y and z-axes, images of printed content can become distorted, for example, due to inaccurate flat fielding of the camera.

In an example, an automated camera flat fielding and alignment system and method are described. The method generally includes determining a magnification of a camera relative to a first camera axis that is generally parallel to a first print media axis by evaluating first and second magnifications between transitions from a first color to a second color on a setup plot, and determining a rotation of the camera relative to the first camera axis such that the first magnification is approximately equal to the second magnification. In an example, the camera may be a line scan camera, and the first print media axis corresponds to a down web direction of print media. The setup plot may include a plurality of equally spaced lines and shapes, and the first color represents a color of a line and the second color represents a color of a space adjacent the line.

The method further includes determining a maximum profile for an image based on a light source directed towards the setup plot by determining a rotation of the camera, relative to a second camera axis that is generally parallel to a second print media axis, that corresponds to a highest maximum profile value. In an example, the second print media axis corresponds to a cross web direction of the print media. The method also includes determining first and second scores corresponding to thickness of first and second shapes on the setup plot and disposed along the second print media axis, and determining a rotation of the camera relative to a third camera axis such that the first score is approximately equal to the second score. In an example, the third camera axis is generally orthogonal to the first and second camera axes.

The automated camera flat fielding and alignment system and method can be used to facilitate digital print press setup, such as, alignment of print heads. The system and method can also be used for verification of print quality during printing, and print job integrity feedback. Cameras may be setup in simplex or duplex modes for imaging across a print media web width on one or both sides of print media (e.g., a paper web). The system and method provide for automatic flat fielding of cameras. A focus camera mode may be used to focus cameras by using the setup plot. The system and method can be used to automatically setup cameras, or to guide a user through the setup process. The system and method thus reduce the lead time for the setup process, and further eliminate variations and inconsistencies in the setup process. These aspects facilitate flat fielding of cameras, resulting in uniform image brightness, and improvement in the overall operational quality of a digital print press. These aspects also provide for consistent magnification and orthogonality to print media, thus eliminating image distortions across an image. Any overlapping camera images of the printed media also produce the same image brightness and quality, providing consistent results across various cameras.

The automated camera flat fielding and alignment system and method provide consistent setup results across web press installations (e.g., a facility including multiple digital print presses), which can thus provide consistency in outputs across web press installations at different locations. The system and method also provide for the remote support and setup of cameras, which can also eliminate the need for actual personnel to travel to a particular site for adjusting a machine vision system. Thus, the system and method provide reduction in the time to setup a web press installation, improvement in accuracy and consistency, elimination of specially trained personnel, and the ability to make changes remotely.

Figure 2:
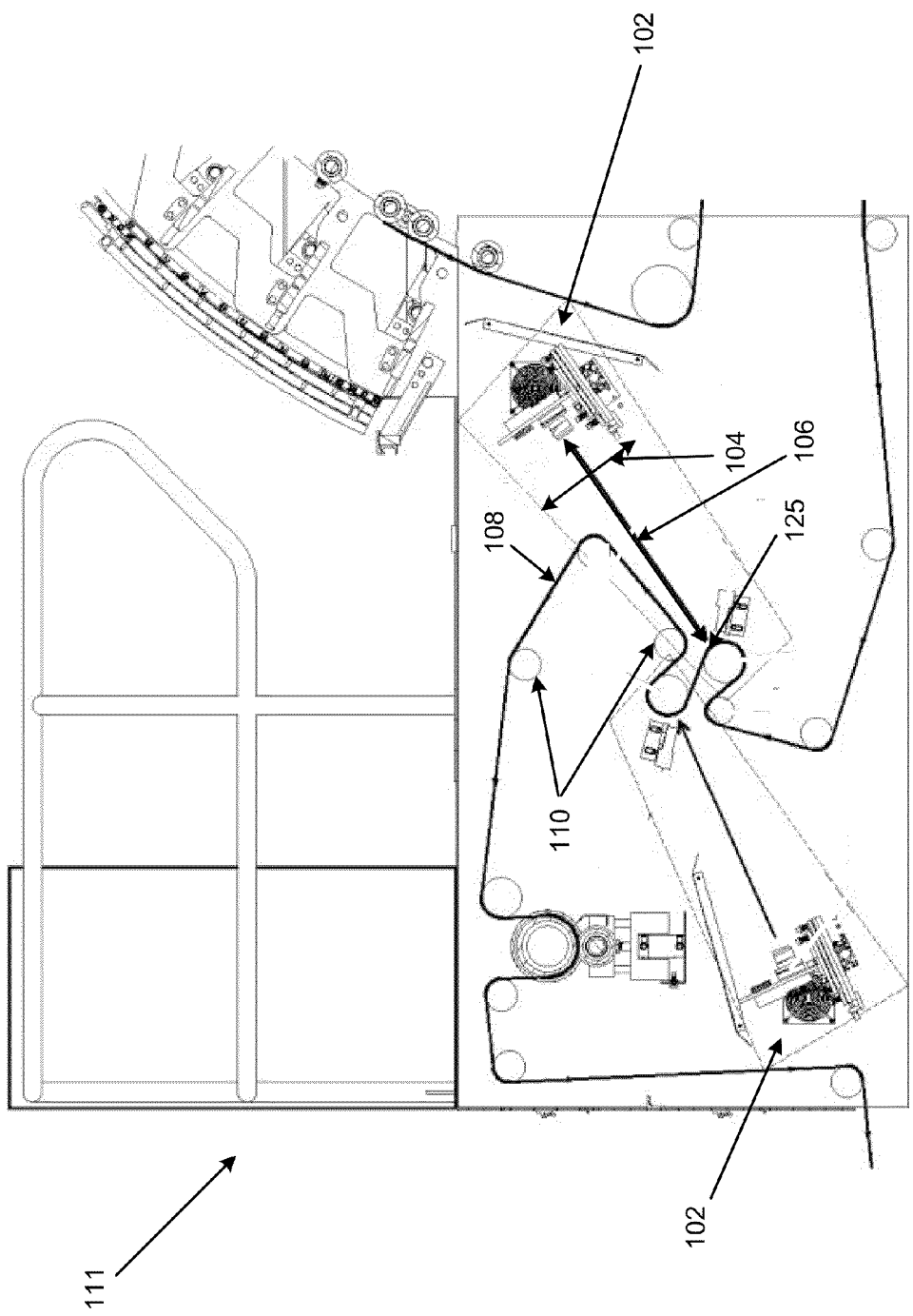
FIG. 2 illustrates a camera to imaging roller orientation, according to an example of the present disclosure.

FIG. 1 illustrates an architecture of an automated camera flat fielding and alignment apparatus 100, according to an example. Referring to FIG. 1, the apparatus 100 is depicted as including a theta-x adjustment module 101 to adjust balancing, and the magnification and focus on the left and right sides of an image of a camera 102 aligned in accordance with a coordinate system 103. The coordinate system 103 is provided for facilitating a description of operation of the camera 102 and the apparatus 100. However, the camera 102 may be aligned using another coordinate system. Generally, the coordinate system 103 includes a x-axis 104, a y-axis 105 and a z-axis 106, each respectively including angles theta-x, theta-y and theta-z, indicating rotation of the camera 102 relative to the x-axis 104, the y-axis 105 and the z-axis 106. Referring to FIGS. 1 and 2, an x-direction 107 along the x-axis 104 may represent a down web direction towards web 108 of print media. The y-direction 109 along the y-axis 105 may represent a cross web direction relative to the web 108. The z-axis 106 of the camera 102 may be positioned centrally along the lens of the camera 102. The web 108 may be provided in a continuous roll and wound around rollers 110 of a digital print press 111. The apparatus 100 may further include a theta-y adjustment module 112 to adjust the rotation of the camera 102 relative to the y-axis 105. A theta-z adjustment module 113 is to adjust the rotation of the camera 102 relative to the z-axis 106. A x-linear translation module 114 is to position the camera 102 along the x-axis 104. A y-linear translation module 115 is to position the camera 102 along the y-axis 105. A z-linear translation module 116 is to position the camera 102 along the z-axis 106, for example, to facilitate setting of the overall camera magnification and focus. The rotation and other features of the camera 102 may be automatically adjusted and controlled by the theta-x, the theta-y, and the theta-z adjustment modules 101, 112 and 113, and further, by the x-translation, the y-translation and the z-translation modules 114, 115 and 116. Alternatively, the theta-x, the theta-y, and the theta-z adjustment modules 101, 112 and 113, and further, the x-translation, the y-translation and the z-translation modules 114, 115 and 116 may guide a user of the camera 102 to adjust and control the camera 102, for example, by using a visible, audible or another type of instructions. A flat fielding module 117 is to flat-field the camera 102 based on the adjustment by the theta-x, the theta-y, and the theta-z adjustment modules 101, 112 and 113, and further, by the x-translation, the y-translation and the z-translation modules 114, 115 and 116.

The modules 101, 112, and 113-117, and other components of the apparatus 100 may comprise machine readable instructions stored on a computer readable medium. In addition, or alternatively, the modules 101, 112, and 113-117, and other components of the apparatus 100 may comprise hardware or a combination of machine readable instructions and hardware.

Figure 3:
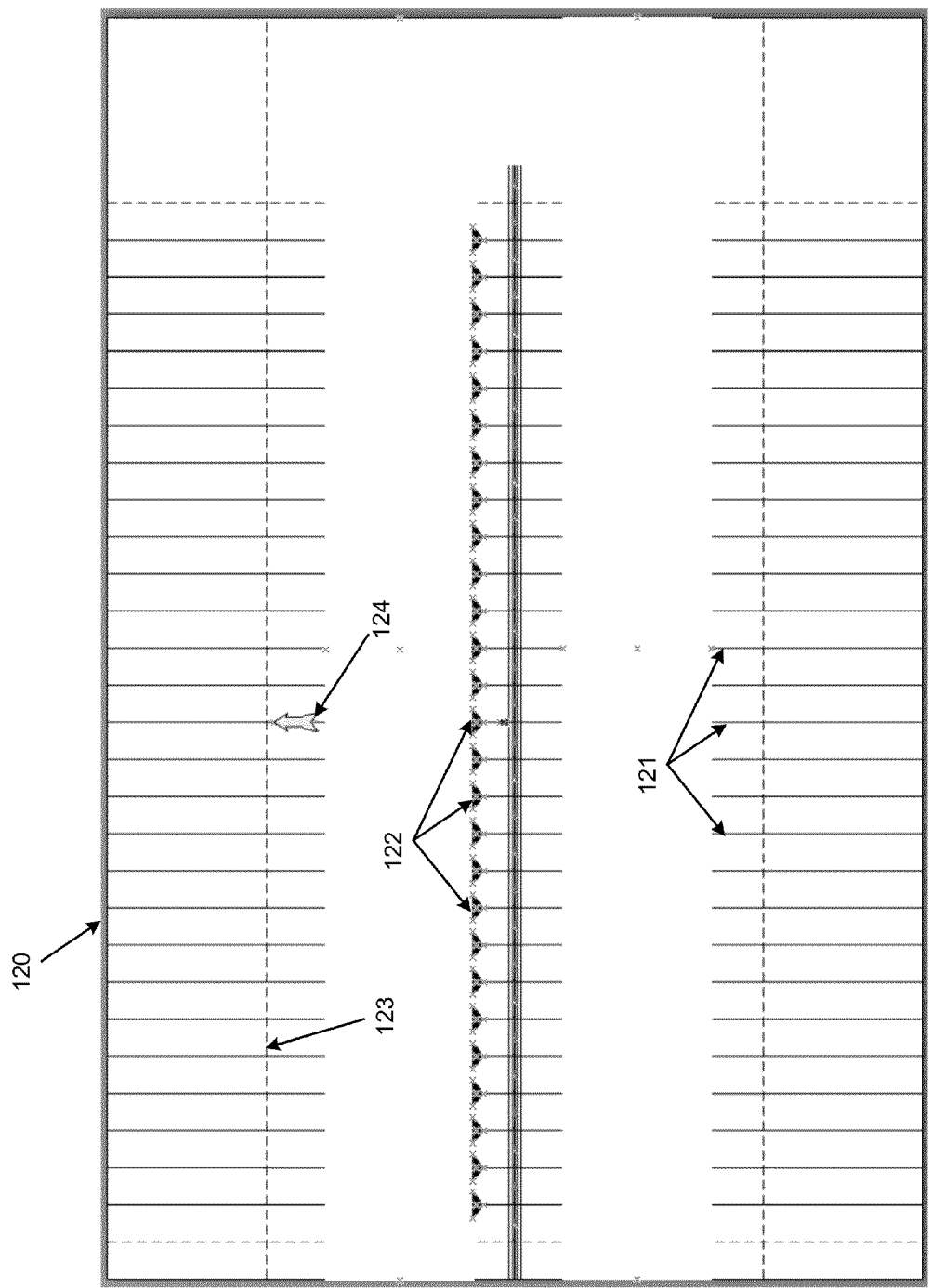
FIG. 3 illustrates a setup plot for camera flat fielding and alignment, according to an example of the present disclosure.
Figure 4:
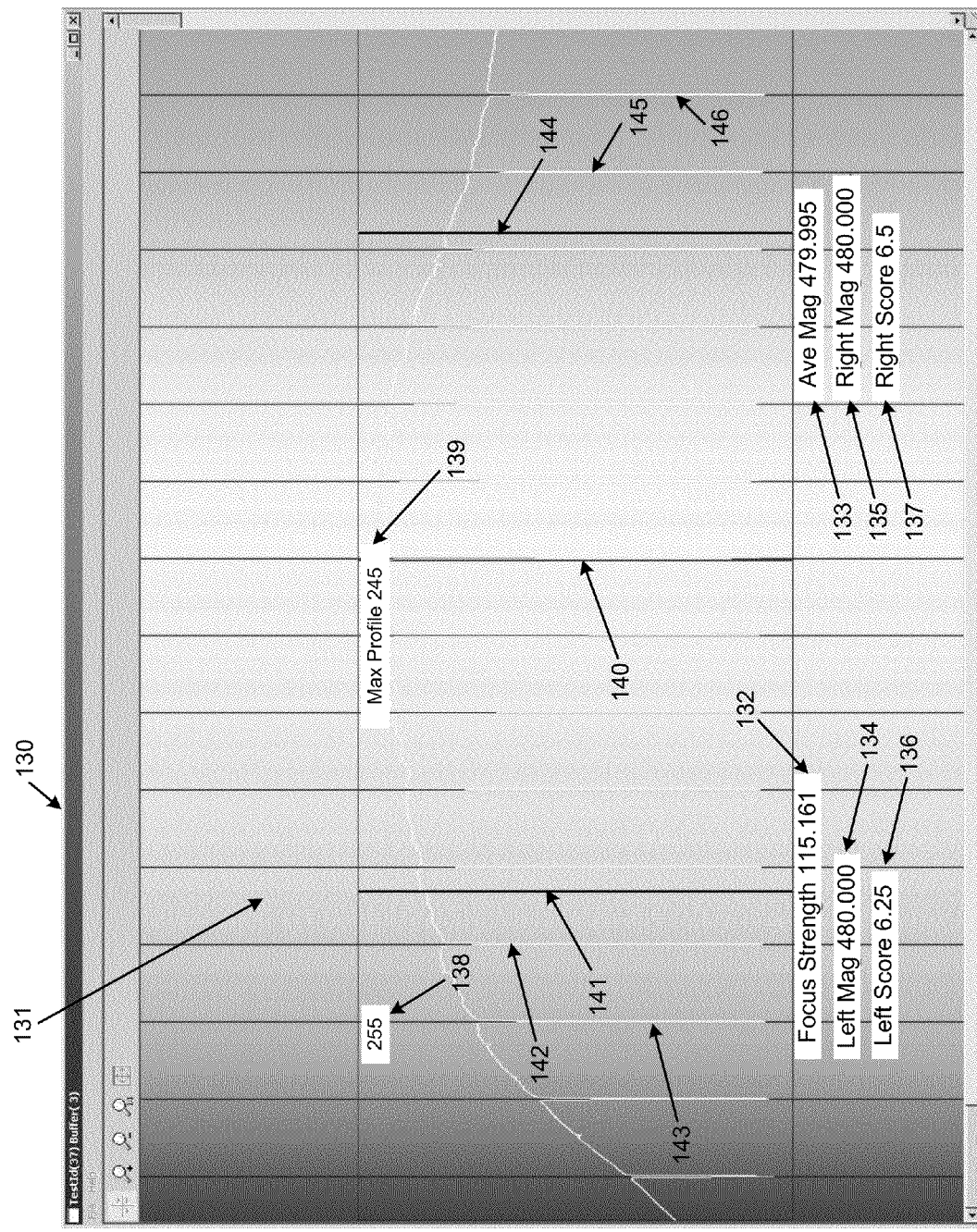
FIG. 4 illustrates an image when using grid lines for camera magnification and focus, according to an example of the present disclosure.
Figure 5:
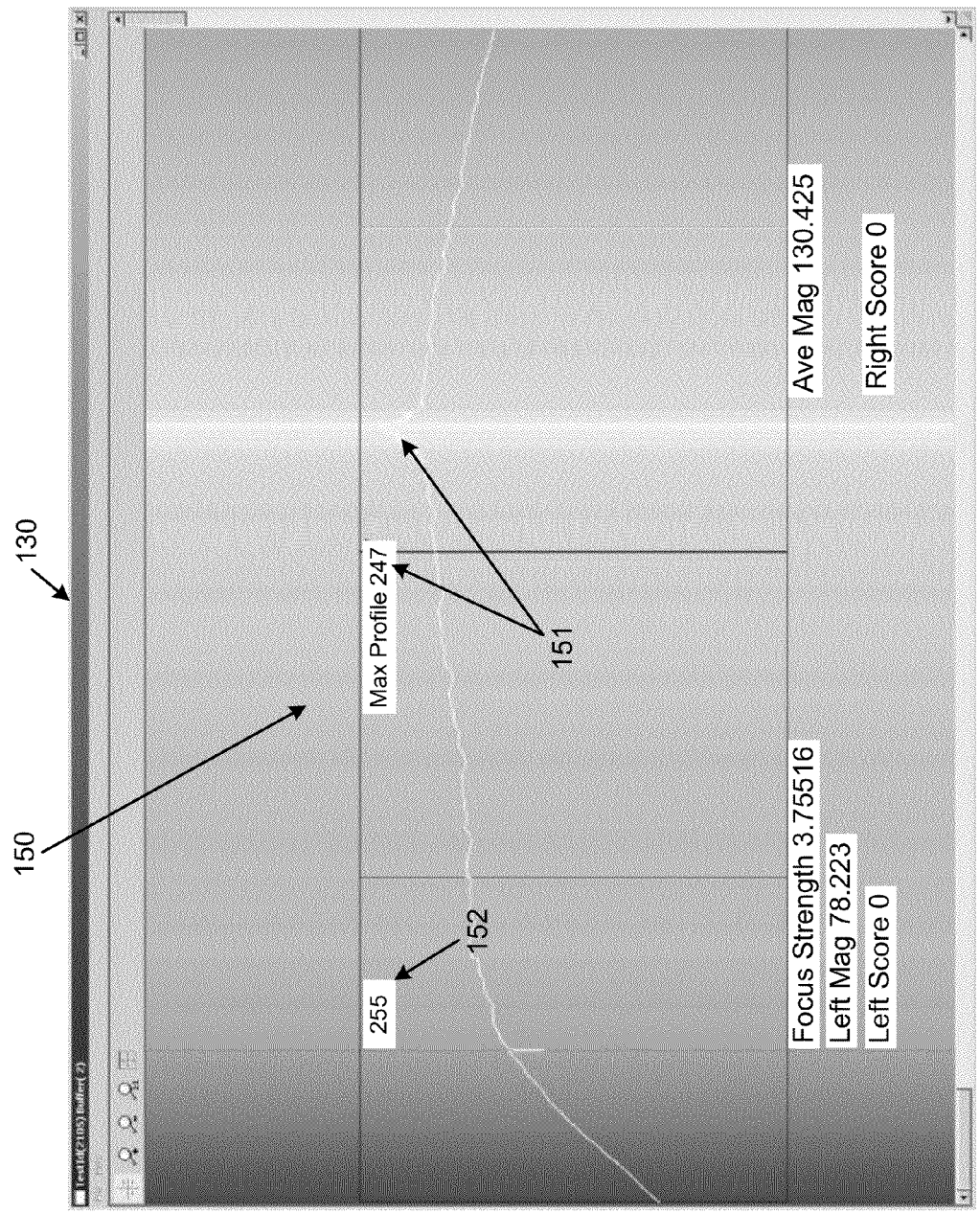
FIG. 5 illustrates a raw image profile showing a light reflection from a web, according to an example of the present disclosure.

Referring to FIGS. 1-3, the theta-x adjustment module 101 adjusts balancing, and the magnification and focus on the left and right sides of an image of the camera 102. The magnification and focus of the camera 102 may be adjusted by using a setup plot 120. The setup plot 120 may include a plurality of evenly spaced lines 121 and shapes 122 along a horizontal direction 123. The horizontal direction 123 may be parallel to the camera y-axis 105, which is parallel to the y-direction 109. Alternatively, the lines 121 and shapes 122 may also be spaced or distributed to include predetermined spacing therebetween. The setup plot 120 may include a central position indicator 124 along the horizontal direction 123. Referring to FIG. 2, the setup plot 120 may be positioned, for example, at location 125 that is directly in the line of sight of the camera 102. Once the setup plot 120 is positioned, referring to FIG. 4, a user interface 130 on the camera 120 or provided with the apparatus 100 may be engaged to display the magnification and focus of the camera 102. For example, the display 131 of the user interface 130 may include focus strength at 132, average magnification at 133, left magnification at 134, right magnification at 135, left score at 136 and right score at 137. The display 131 may also indicate a maximum achievable profile at 138 and a maximum profile at 139, which are discussed in further detail below. A central line 140, which may be colored (e.g., red), may coincide with the central position indicator 124 of FIG. 3 to centralize the camera 102 relative to the y-axis 105. The camera 102 may be automatically centralized by the y-linear translation module 115 when, for example, a visual or audible indicator indicates that the central line 140 coincides with the central position indicator 124. Alternatively, the y-linear translation module 115 may guide a user of the camera 102 to centralize the camera, for example, by using a visual, an audible or another type of instructions when the central line 140 coincides with the central position indicator 124.

Referring to FIGS. 1-4, the focus strength at 132 displays the average strength of all the black to white transitions. Alternatively, for a colored setup plot 120, the focus strength at 132 displays the average strength of all transitions from one color to another. For example, for the setup plot 120, the focus strength at 132 displays, for example, on a scale from 0 to 255, the average strength of all the black to white transitions of the lines 121 and the white spaces therebetween. The units of profile (e.g., 255 and maximum profile at 139) are in gray scale units, where 8 bits equate to a maximum of 256 values (i.e., 0-255). The z-linear translation module 116 may automatically adjust the focus of the camera 102 until a maximum focus strength is achieved. For example, the z-linear translation module 116 may automatically adjust the focus of the camera 102 from one extreme to another until a maximum focus strength is determined, and thereafter adjust the focus of the camera 102 to correspond to the maximum focus strength. Alternatively, the z-linear translation module 116 may guide a user of the camera 102, for example, by using a visual, an audible or another type of instructions to focus the camera 102 to obtain the maximum focus strength.

The average magnification at 133 displays the average separation of all the black to white transitions. For a colored setup plot 120, the average magnification at 133 displays the average separation of transitions from a first color to a second color. For example, for the setup plot 120, the average magnification at 133 displays, for example, the average magnification in pixels per inch between the lines 121. For example, on a 480 ppi display, assuming the lines 121 are spaced exactly one inch apart, the z-linear translation module 116 may automatically adjust the camera 102 along the z-axis 106 until the average magnification at 133 is 480.0+/−0.0xx. Other display settings (e.g., 300 ppi) may be used based on the parameters of the camera 102. Alternatively, the z-linear translation module 116 may guide a user of the camera 102, for example, by using a visual, an audible or another type of instructions to adjust the camera 102 along the z-axis 106 to obtain the average magnification at 133 of 480.0+/−0.0xx.

The left magnification at 134 and the right magnification at 135 may display magnification in pixels per inch between black to white transitions respectively to the left and right sides of lines 141 and 144. For a colored setup plot 120, the left magnification at 134 and the right magnification at 135 may display magnification in pixels per inch between different color transitions respectively to the left and right sides of the lines 141 and 144. For example, the left magnification at 134 may display average magnification in pixels per inch between line pairs at 142 and 143, and between any complete line pairs to the left of the line pairs at 142 and 143. Similarly, the right magnification at 135 may display average magnification in pixels per inch between line pairs at 145 and 146, and between any complete line pairs to the right of the line pairs at 145 and 146. For example, on a 480 ppi display, assuming the lines 121 are spaced exactly one inch apart, the theta-x adjustment module 101 may automatically adjust the rotation of the camera 102 in the theta-x direction until the left and right magnifications at 134 and 135 are equal (i.e., 480.0+/−0.0xx). For the example of the 480 ppi display and the one inch spaced lines 121, the left and right magnifications at 134 and, 135 of 480.0+/−0.0xx correspond to a theta-x of approximately zero degrees. Alternatively, the theta-x adjustment module 101 may guide a user of the camera 102, for example, by using a visual, an audible or another type of instructions to adjust a rotation of the camera 102 in the theta-x direction until the left and right magnifications at 134 and 135 are equal (i.e., 480.0+/−0.0xx).

The left score at 136 and the right score at 137 represent the average thickness from the top to the bottom of the lines 142, 143 and 145, 146 respectively to the left and right sides of the lines 141 and 144. The left score at 136 and the right score at 137 can also be used to represent the average thickness from the top to the bottom of the areas between the lines 142, 143 and 145, 146 respectively to the left and right sides of the lines 141 and 144. The left score at 136 and the right score at 137 are described in further detail below with reference to the theta-z adjustment module 113.

Referring to FIGS. 1-5, in order to adjust the camera 102 in the theta-y direction, for the image 150 displayed on the user interface 130, the theta-y adjustment module 112 may determine a maximum profile at 151 by rotating the camera 102 in a theta-y direction. The camera 102 may include a light source directed orthogonally toward the web 108 such that the resulting plot profile includes a change in the profile. The theta-y adjustment module 112 may automatically adjust the rotation of the camera 102 in a theta-y direction until the maximum profile at 151 is maximized (i.e., a highest maximum profile value is determined). For example, the theta-y adjustment module 112 may rotate the camera 102 in the positive and negative theta-y directions to determine the highest maximum profile value for the maximum profile at 151, and then automatically adjust the rotation of the camera 102 in the theta-y direction such that the maximum profile at 151 corresponds to the highest maximum profile value. The highest maximum profile value of the maximum profile at 151 corresponds to an orthogonal orientation of the camera 102 relative to the web 108, and may be determined on a scale of 0-255 at 152. Alternatively, the theta-y adjustment module 112 may guide a user of the camera 102, for example, by using a visual, an audible or another type of instructions to rotate the camera 102 in the theta-y direction such that the maximum profile at 151 corresponds to the highest maximum profile value.

Figure 6:
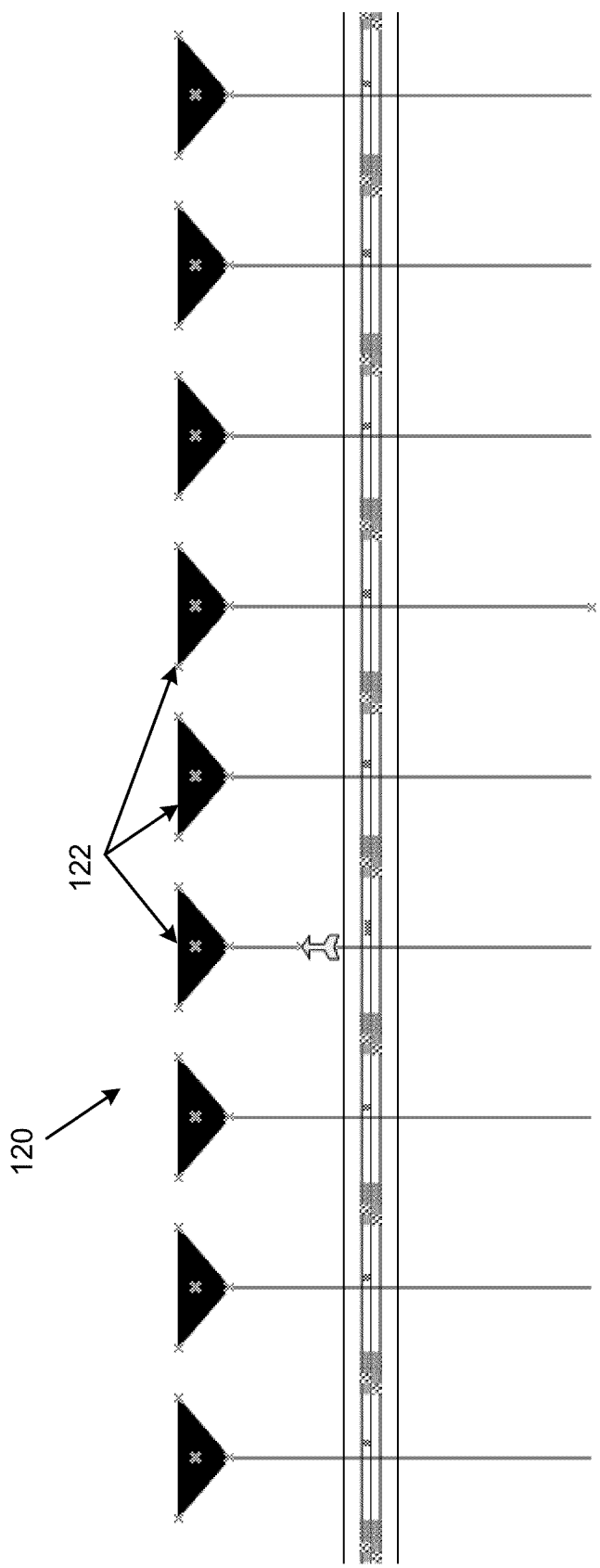
FIG. 6 illustrates an enlarged view of an alignment plot showing theta-z alignment triangles, according to an example of the present disclosure.
Figure 7:
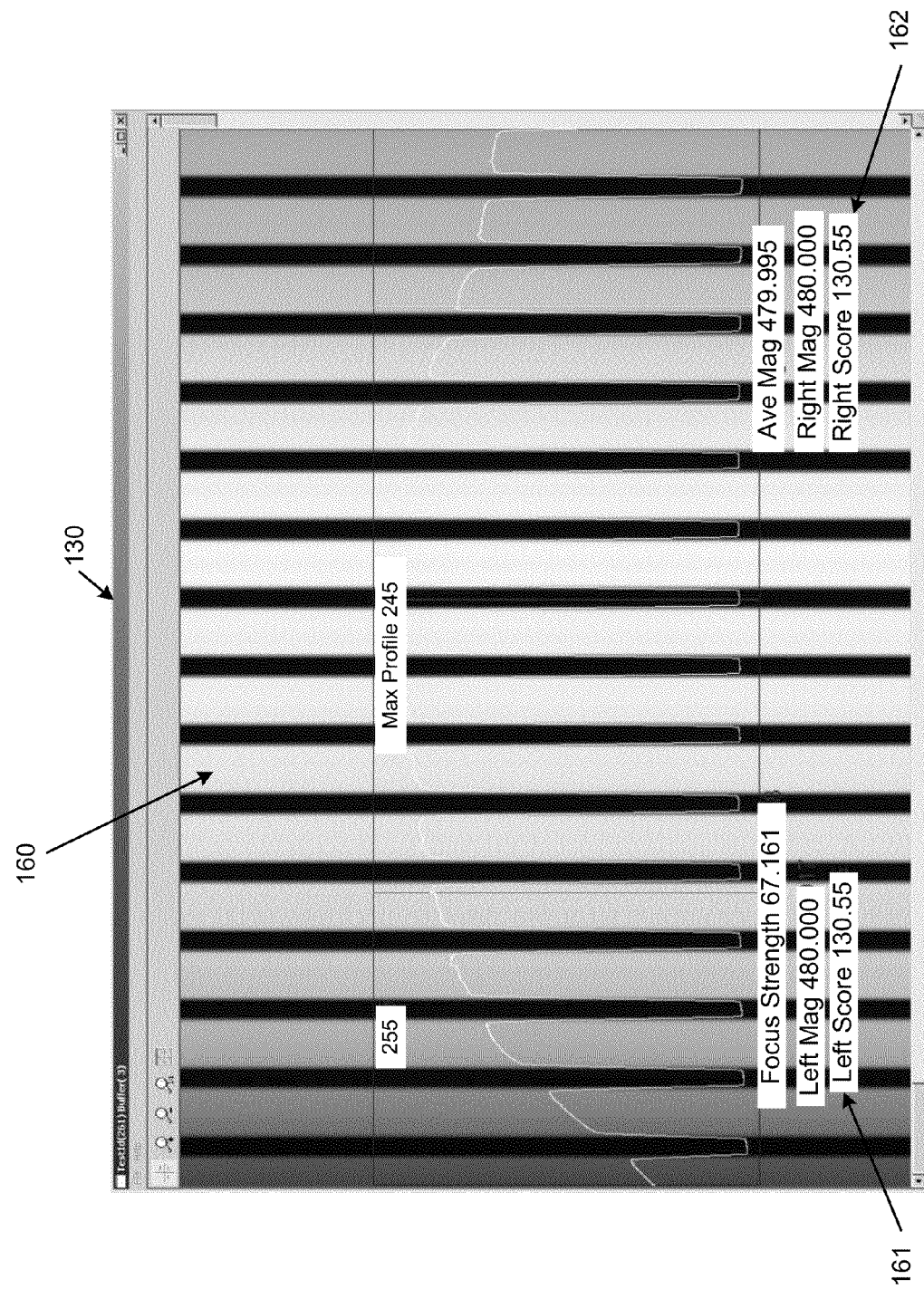
FIG. 7 illustrates an image with alignment triangles under a line scan imager in streaming mode, according to an example of the present disclosure.

Referring to FIGS. 1-4 and 6-9, in order to adjust the camera 102 in the theta-z direction, the theta-z adjustment module 113 may determine the left score at 136 and the right score at 137. The left score at 136 and the right score at 137 represent the average thickness, for example, of the shapes 122 of the setup plot 120 to the left and right sides of the lines 141 and 144 of FIG. 4. The thickness of the shapes 122 may be measured, for example, by the charge-coupled device (CCD) sensor of the camera 102. The shapes 122 may be triangular, or include other configurations that have a predetermined thickness. For example, FIG. 6 shows an enlarged view of the shapes 122 of the setup plot 120 of FIG. 3. FIG. 7 shows an image 160 displayed on the user interface 130 with the shapes 122 under a line scan imager in streaming mode. The left score at 161 and the right score at 162 therefore represent the average thickness from the top to the bottom of the image 160 of the shapes 122 of the setup plot 120 to the left and right sides of the lines 141 and 144 of FIG. 4. For example, the theta-z adjustment module 113 may rotate the camera 102 in the positive and negative theta-z directions until the left score at 161 and the right score at 162 are approximately equal. If the camera 102 is rotated in a theta-z direction relative to the shapes 122 as shown in FIG. 8, for the line scan shown, the left score at 161 which corresponds to a smaller average thickness at 163 and the right score at 162 which corresponds to a relatively greater average thickness at 164 will not be equal. Alternatively, if the camera 102 is not rotated relative to the shapes 122 as shown in FIG. 9 (i.e., theta-z is zero degrees), the left score at 161 representing the average thickness at 165 will be equal to the right score at 162 representing the same average thickness 166. The theta-z adjustment module 113 may also guide a user of the camera 102, for example, by using a visual, an audible or another type of instructions to rotate the camera 102 until the left score at 161 is equal to the right score at 162 such that theta-z is zero degrees.

Referring to FIGS. 1-4 and 10, the flat fielding module 117 is to flat-field the camera 102 based on the adjustment by the theta-x, the theta-y, and the theta-z adjustment modules 101, 112 and 113, and further, by the x-translation, the y-translation and the z-translation modules 114, 115 and 116. Specifically, once the theta-x, the theta-y, and the theta-z adjustment modules 101, 112 and 113, and further, the x-translation, the y-translation and the z-translation modules 114, 115 and 116 have properly adjusted the camera 102, the flat fielding module 117 performs flat fielding of the camera 102. The flat fielding may be performed by determining a maximum image brightness value, and automatically adjusting light levels until an image profile matching the maximum image brightness value is obtained. Further, camera gain parameters may be determined by calculating analog tap gains, dark field settings, and digital pixel gain values, for example, for white, red, green, and blue lighting.

Figure 10:
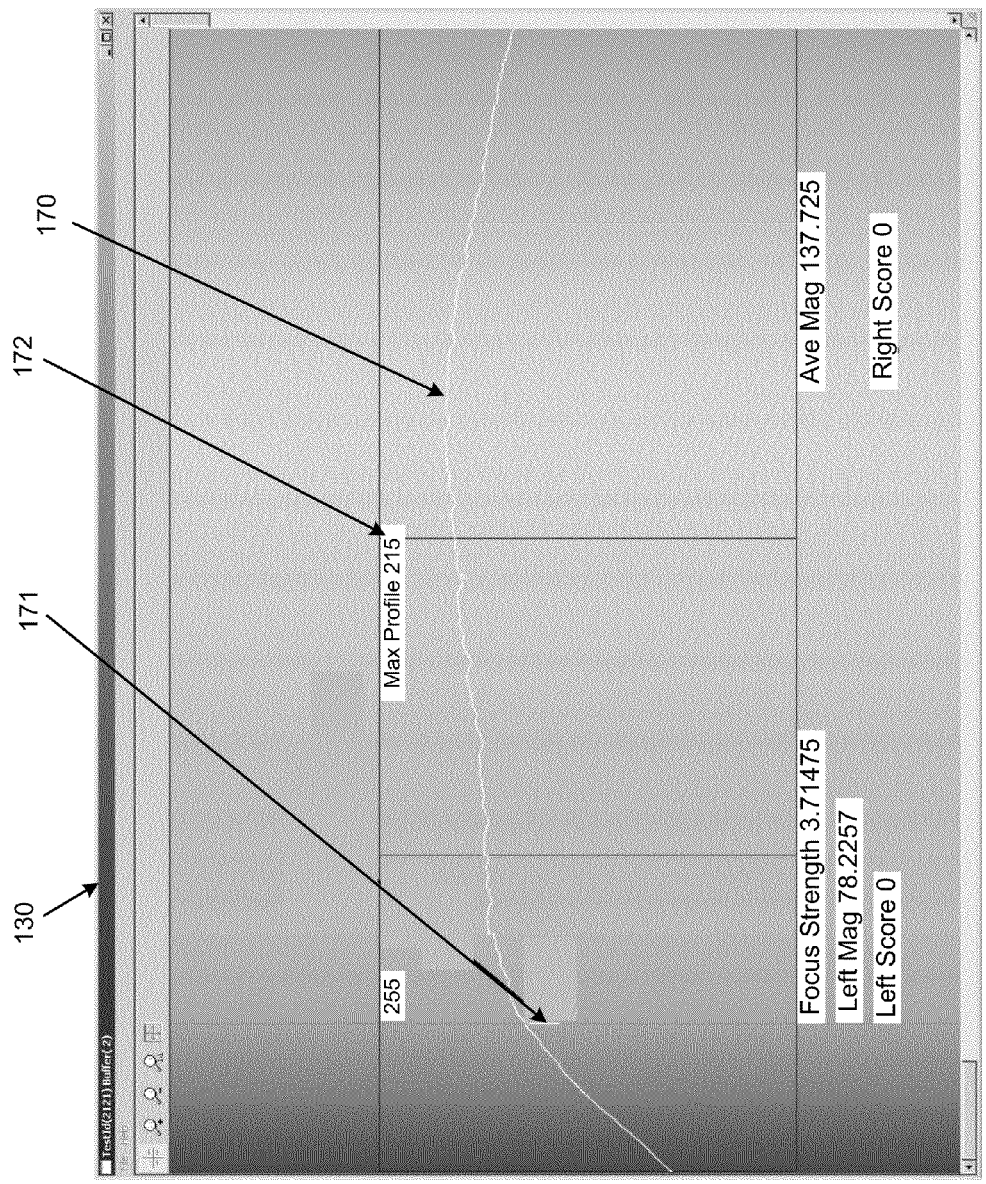
FIG. 10 illustrates an image profile without any flat field corrections, according to an example of the present disclosure.

Specifically, the flat fielding module 117 utilizes preset desired maximum image brightness values from a configuration file, automatically resets gain parameters for the camera 102, and automatically adjusts light levels until an image profile matching the desired image brightness value is obtained. For example, the image profile 170 displayed on the user interface 130 is shown in FIG. 10, and is based on adjustment of light levels until an image profile matching the desired image brightness value is obtained. For example, for FIG. 10, a maximum profile of 215 is obtained based on a scale from 0 to 255 and corresponds to an image profile matching the desired image brightness value. Maximizing the image profile can reduce noise in a flat fielded image. The display of FIG. 10 represents an image profile prior to flat fielding. If the image profile 170 includes a dip, such as a dip at 171, the dip is detected by the flat fielding module 117. The dip at 171 may represent the presence of an anomaly (e.g., a particle) on the CCD of the camera 102, or on the setup plot 120. The dip at 171 may be detected by calculating a change in the image profile across a web (e.g., across the web 108 along the y-axis direction) and determining if the change exceeds a predetermined threshold. For example, if the change at 171 exceeds a predetermined threshold of 15, the dip at 171 may be determined to represent the presence of an anomaly. The flat fielding module 117 may automatically remove the anomaly by an air jet or another source, or prompt a user of the camera 102 for removal of the anomaly by using a visual, an audible or another type of instructions.

Figure 11:
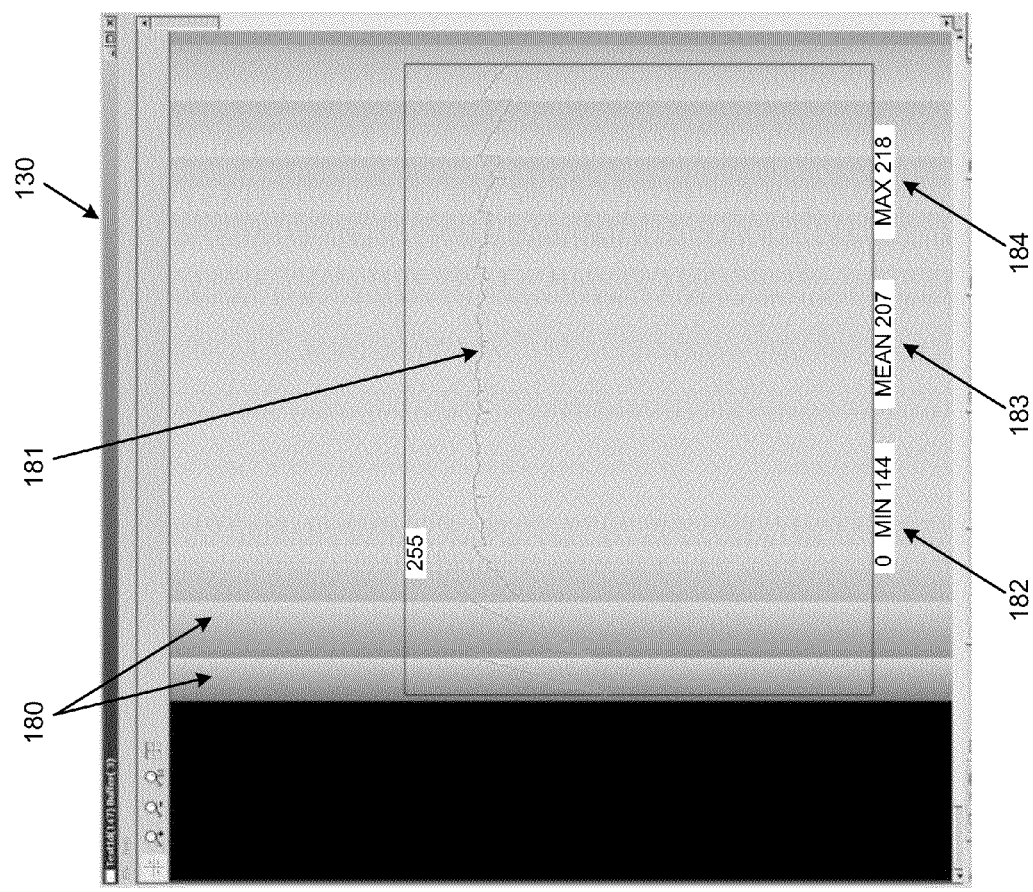
FIG. 11 illustrates an image showing individual tap gain offsets, according to an example of the present disclosure.
Figure 12:
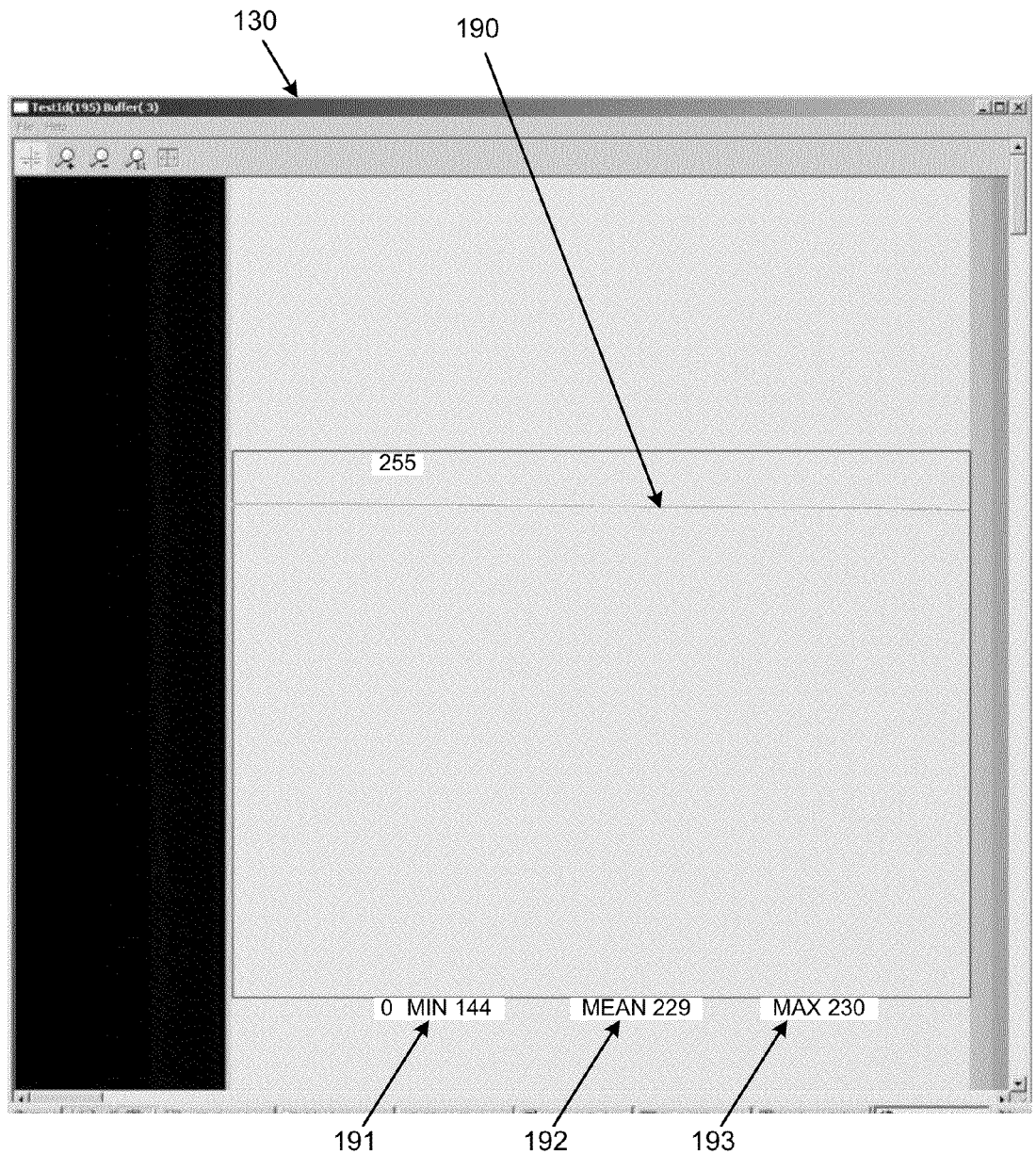
FIG. 12 illustrates an image showing final flat field results, according to an example of the present disclosure.

Referring to FIG. 11, after adjustment of light levels of lights adjacent the camera 102, analog tap gains are calculated. With regard to analog tap gains, line scan cameras can have a large imager (e.g., 8196 pixels wide) with controlling electronics being subdivided into subsections called taps, as shown at 180 in FIG. 11. The analog tap gains are shown at 181 for the user interface 130. A camera may include, for example, sixteen taps across an imager. Each of the taps has its own gain and offset, which are generally different from neighboring tap gain and offset values. Further, each individual pixel has its own gain and offset according to the needs of the individual pixel sensitivities. The result of these compounding gains and offsets can be an erratic image brightness across an image (e.g., non-flat white images), as shown in FIG. 11. The values at 182, 183, and 184 respectively represent the minimum, mean and maximum values of the image profile after the analog tap gains have been applied. The flat fielding module 117 calculates dark field settings, and digital pixel gain values for white, red, green, and then blue lighting. Based on the calculated values, the flat fielding process results are shown in FIG. 12 at 190 for the user interface 130. The values at 191, 192 and 193 respectively represent the minimum, mean and maximum values of the flat field process results. For a white light including the combination of red, green, and blue lighting, the flat fielding module 117 adjusts each individual color and combines the adjusted individual color with the previously adjusted color. The flat fielding module 117 also limits the maximum drive voltage to a light source for lights adjacent the camera 102 that are used to provide lighting onto the web 108 for imaging by the camera 102. For example, if a maximum drive voltage to a light source is achieved, the flat fielding process continues at the maximum drive voltage. If the raw image profile is greater than a preset limit away from a desired level, the flat fielding module 117 prevents overdriving of the camera gain calculations. For example, referring to FIG. 10, for the maximum profile of 215, if a raw image profile is at 145 (i.e., greater than a preset limit of 30 away from a desired level (i.e., 215−145=70), the flat fielding module 117 prevents overdriving of the camera gain calculations.

Figure 13:
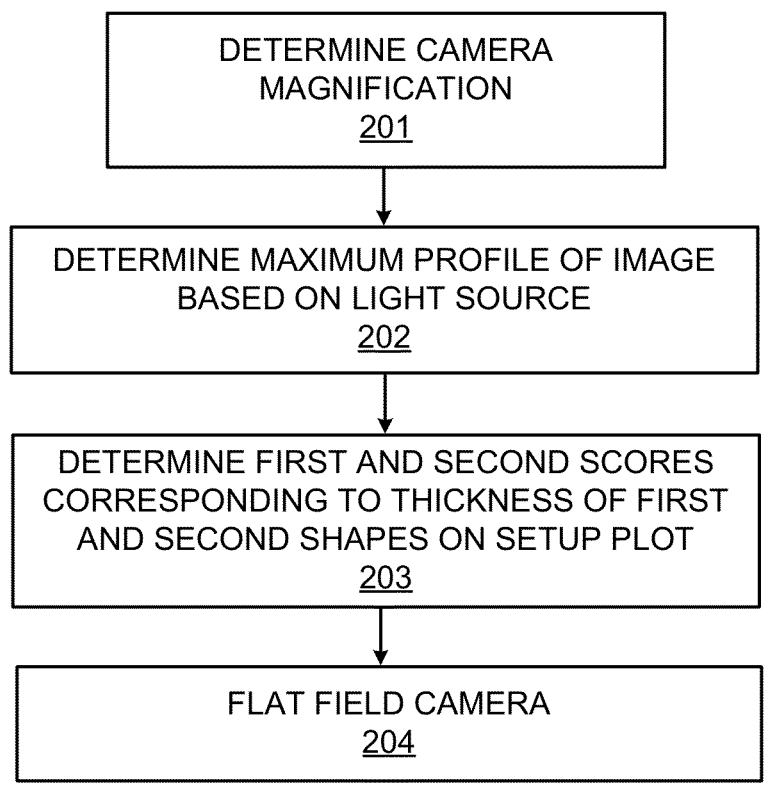
FIG. 13 illustrates a method for automated camera flat fielding and alignment, according to an example of the present disclosure.

FIG. 13 illustrates a flowchart of a method 200 for automated camera flat fielding and alignment, corresponding to the example of the automated camera flat fielding and alignment apparatus 100 whose construction is described in detail above. The method 200 may be implemented on the automated camera flat fielding and alignment apparatus 100 with reference to FIG. 1 by way of example and not limitation. The method 200 may be practiced in other apparatus.

Referring to FIG. 13, for the method 200, at block 201, a magnification of a camera relative to a first camera axis that is generally parallel to a first print media axis is determined by evaluating first and second magnifications between transitions from a first color to a second color on a setup plot. A rotation of the camera relative to the first camera axis is determined such that the first magnification is approximately equal to the second magnification. For example, referring to FIG. 1, the theta-x adjustment module 101 adjusts the balancing, and the magnification and focus on the left and right sides of an image of the camera 102 aligned in accordance with the coordinate system 103. The first print media axis (e.g., the x-axis 104) corresponds to a down web direction (e.g., the x-direction 107) of print media (e.g., the web 108). As shown in FIG. 3, the setup plot 120 includes a plurality of equally spaced lines 121, and the first color represents a color of a line and the second color represents a color of a space adjacent the line. The first magnification corresponds to a first transition along a second print media axis and the second magnification corresponds to a second transition along the second print media axis, and the first and second transitions are located on opposite sides and equally spaced from the first print media axis. The second print media axis (e.g., the y-axis 105) corresponds to a cross web direction (e.g., the y-direction 109) of the print media. For example, referring to FIG. 4, the left magnification at 134 and the right magnification at 135 may display magnification in pixels per inch between black to white transitions respectively to the left and right sides of the lines 141 and 144. For example, on a 480 ppi display, assuming the lines 121 are spaced exactly one inch apart, the theta-x adjustment module 101 may automatically adjust the rotation of the camera 102 in the theta-x direction until the left and right magnifications at 134, 135 are equal (i.e., 480.0+/−0.0xx).

At block 202, a maximum profile for an image based on a light source directed towards the setup plot is determined by determining a rotation of the camera, relative to a second camera axis that is generally parallel to the second print media axis, that corresponds to a highest maximum profile value. For example, referring to FIG. 1, the theta-y adjustment module 112 adjusts the rotation of the camera 102 relative to the y-axis 105. Referring to FIGS. 1-5, in order to adjust the camera 102 in the theta-y direction, for the image 150 displayed on the user interface 130, the theta-y adjustment module 112 determines a maximum profile at 151 by rotating the camera 102 in a theta-y direction. The theta-y adjustment module 112 may automatically adjust the rotation of the camera 102 in a theta-y direction until the maximum profile at 151 is maximized (i.e., a highest maximum profile value is determined).

At block 203, first and second scores corresponding to thickness of first and second shapes on the setup plot and disposed along the second print media axis are determined. Further, a rotation of the camera relative to a third camera axis is determined such that the first score is approximately equal to the second score. For example, referring to FIG. 1, the theta-z adjustment module 113 adjusts the rotation of the camera 102 relative to the z-axis 106. The third camera axis (e.g., the z-axis 106) is generally orthogonal to the first and second camera axes (e.g., the x-axis 104 and the y-axis 105). Referring to FIGS. 1-4 and 6-9, in order to adjust the camera 102 in the theta-z direction, the theta-z adjustment module 113 determines the left score at 136 and the right score at 137. As shown in FIG. 6, the shapes may be triangular and generally equally spaced along the second print media axis.

At block 204, once the first magnification is approximately equal to the second magnification, the highest maximum profile value is determined, and the first score is approximately equal to the second score, the camera is automatically flat fielded. For example, referring to FIG. 1, the flat fielding module 117 automatically flat-fields the camera 102 based on the adjustment by the theta-x, the theta-y, and the theta-z adjustment modules 101, 112 and 113, and further, by the x-translation, the y-translation and the z-translation modules 114, 115 and 116. Flat fielding the camera 102 includes adjusting a light level until an image profile matching a desired image brightness value is obtained, and evaluating the image profile to determine a change that exceeds a predetermined threshold.

Figure 14:
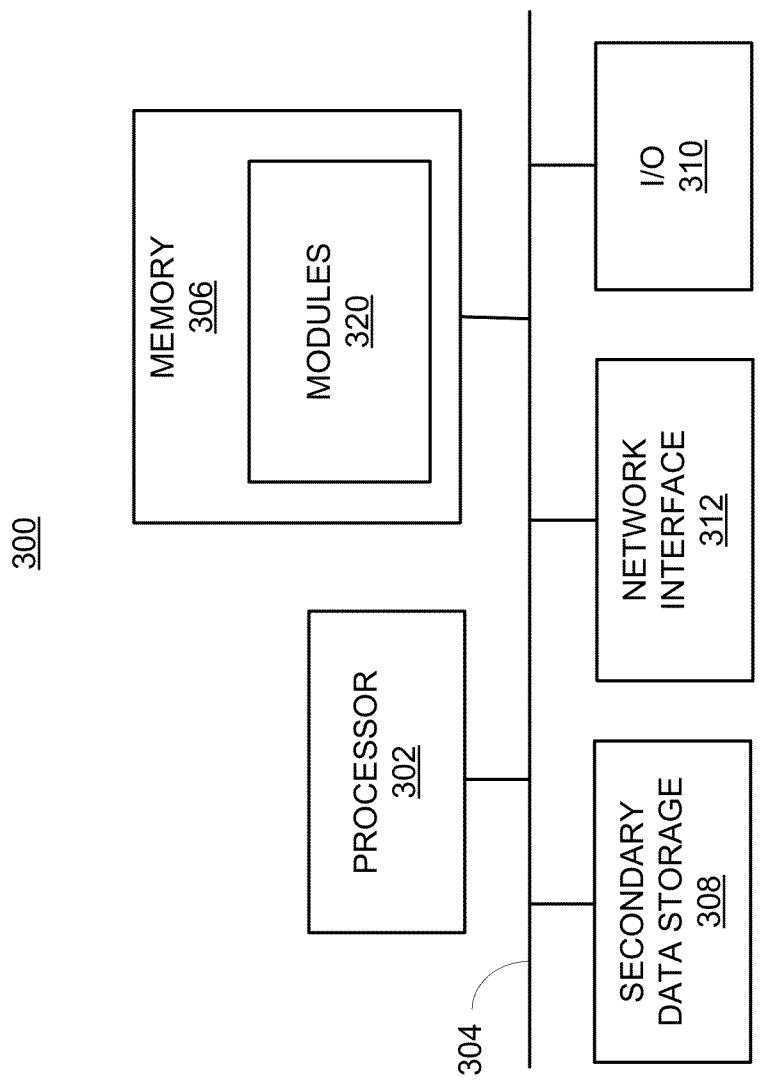
FIG. 14 illustrates a computer system, according to an example of the present disclosure.

FIG. 14 shows a computer system that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 302 that may implement or execute machine readable instructions performing some or all of the methods, functions and other processes described herein. Commands and data from the processor 302 are communicated over a communication bus 304. The computer system also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include modules 320 including machine readable instructions residing in the memory 306 during runtime and executed by the processor 302. The modules 320 may include the modules 101, 112, and 113-117 of the apparatus shown in FIG. 1.

The computer system may include an I/O device 310, such as a keyboard, a mouse, a display, etc. The computer system may include a network interface 312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for automated camera flat fielding and alignment, the method comprising:
   determining a magnification of a camera relative to a first camera axis that is generally parallel to a first print media axis by evaluating first and second magnifications between transitions from a first color to a second color on a setup plot; and
   determining, by a processor, a rotation of the camera relative to the first camera axis such that the first magnification is approximately equal to the second magnification.

2. The method of claim 1, further comprising:
   determining a maximum profile for an image based on a light source directed towards the setup plot by determining a rotation of the camera, relative to a second camera axis that is generally parallel to a second print media axis, that corresponds to a highest maximum profile value.

3. The method of claim 2, further comprising:
   determining first and second scores corresponding to thickness of first and second shapes on the setup plot and disposed along the second print media axis; and
   determining a rotation of the camera relative to a third camera axis such that the first score is approximately equal to the second score.

4. The method of claim 3, wherein:
   the first print media axis corresponds to a down web direction of print media,
   the second print media axis corresponds to a cross web direction of the print media, and
   the third camera axis is generally orthogonal to the first and second camera axes.

5. The method of claim 3, wherein the shapes are triangular and generally equally spaced along the second print media axis.

6. The method of claim 2, wherein:
   the first magnification corresponds to a first transition along the second print media axis and the second magnification corresponds to a second transition along the second print media axis, and
   the first and second transitions are located on opposite sides and equally spaced from the first print media axis.

7. The method of claim 1, wherein the setup plot includes a plurality of equally spaced lines, and the first color represents a color of a line and the second color represents a color of a space adjacent the line.

8. The method of claim 1, further comprising:
   automatically rotating the camera.

9. The method of claim 1, further comprising:
   providing instructions to a user to rotate the camera.

10. The method of claim 1, wherein the camera is a line scan camera.

11. The method of claim 3, further comprising:
    automatically flat fielding the camera when the camera is rotated such that:
    the first magnification is approximately equal to the second magnification,
    the highest maximum profile value is determined, and
    the first score is approximately equal to the second score.

12. The method of claim 1, further comprising:
    flat fielding the camera by:

adjusting a light level until an image profile matching a desired image brightness value is obtained, and evaluating the image profile to determine a change that exceeds a predetermined threshold.

13. The method of claim 12, further comprising:

automatically removing an anomaly that causes the change.

14. An automated camera flat fielding and alignment apparatus comprising:

a memory storing a module comprising machine readable instructions to:

determine a magnification of a camera relative to a first camera axis that is generally parallel to a first print media axis by evaluating first and second magnifications between transitions from a first color to a second color on a setup plot;

rotate the camera relative to the first camera axis such that the first magnification is approximately equal to the second magnification; and determine a maximum profile for an image based on a light source directed towards the setup plot by rotating the camera, relative to a second camera axis that is generally parallel to a second print media axis, to determine a highest maximum profile value; and a processor to implement the module.

15. A non-transitory computer readable medium having stored thereon machine readable instructions for automated camera flat fielding and alignment, the machine readable instructions when executed cause a computer system to:

determine a magnification of a camera relative to a first camera axis that is generally parallel to a first print media axis by evaluating first and second magnifications between transitions from a first color to a second color on a setup plot;

determine a rotation of the camera relative to the first camera axis such that the first magnification is approximately equal to the second magnification;

determine first and second scores corresponding to thickness of first and second shapes on the setup plot and disposed along a second print media axis that is generally parallel to a second camera axis; and determine, by a processor, a rotation of the camera relative to a third camera axis such that the first score is approximately equal to the second score.

* * * * *